United States Patent
Vitek et al.

(10) Patent No.: US 9,439,037 B2
(45) Date of Patent: Sep. 6, 2016

(54) LOCATION DETERMINATION IN WIRELESS NETWORKS

(71) Applicant: Aruba Networks Inc., Sunnyvale, CA (US)

(72) Inventors: Clark Vitek, Vancouver, WA (US); Tai Yu, Fremont, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 104 days.

(21) Appl. No.: 14/446,468

(22) Filed: Jul. 30, 2014

(65) Prior Publication Data
US 2016/0037300 A1  Feb. 4, 2016

(51) Int. Cl.
*H04W 24/00* (2009.01)
*H04W 4/02* (2009.01)
*H04B 17/318* (2015.01)
*H04B 17/27* (2015.01)

(52) U.S. Cl.
CPC .............. *H04W 4/023* (2013.01); *H04B 17/27* (2015.01); *H04B 17/318* (2015.01)

(58) Field of Classification Search
CPC ............................... H04W 64/00; H04W 4/02
USPC ........................................... 455/456.3, 456.1
See application file for complete search history.

(56) References Cited

U.S. PATENT DOCUMENTS

2013/0045750 A1* 2/2013 Kim .................... G01S 5/14
                                                 455/456.1

OTHER PUBLICATIONS

Pu, "Indoor Location Tracking using Received Signal Strength Indicator", Emerging Communications for Wireless Sensor Networks: Chapter 11, Feb. 7, 2011, pp. 229-256.

* cited by examiner

*Primary Examiner* — Chuck Huynh

(57) ABSTRACT

A system configured to perform operations including: determining a first received signal strength, at a first locator device located at a first location, for a signal transmitted by a target device; determining a second received signal strength, at a second locator device located at a second location, for the signal transmitted by the target device; determining a third received signal strength, at a third locator device located at a third location, for the signal transmitted by the target device; determining an average received signal strength of the first, second, and third received signal strengths; and determining a first distance from the first locator device to the target device based at least on (a) the average received signal strength, (b) the first received signal strength, and (c) the distance from the first locator device to a circumcenter of the first location, the second location, and the third location.

19 Claims, 9 Drawing Sheets

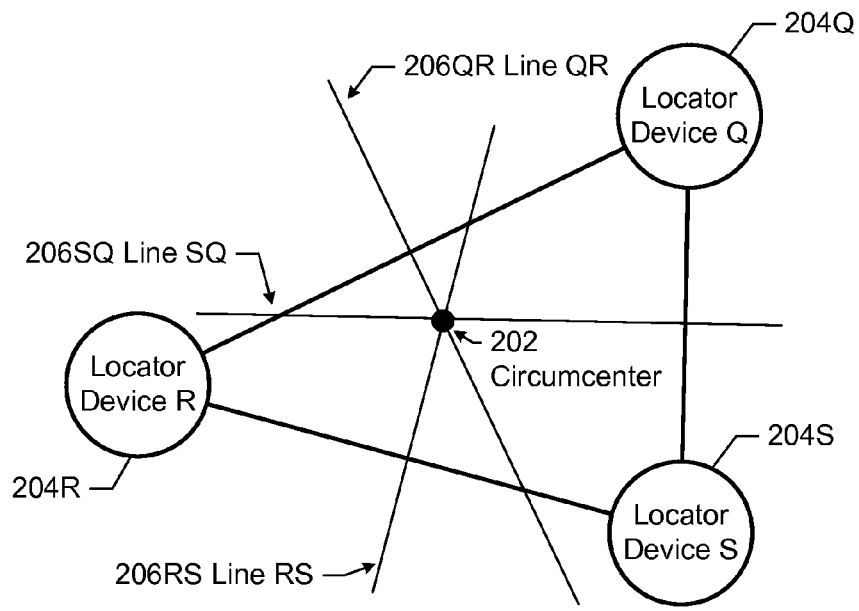
FIG. 2.1
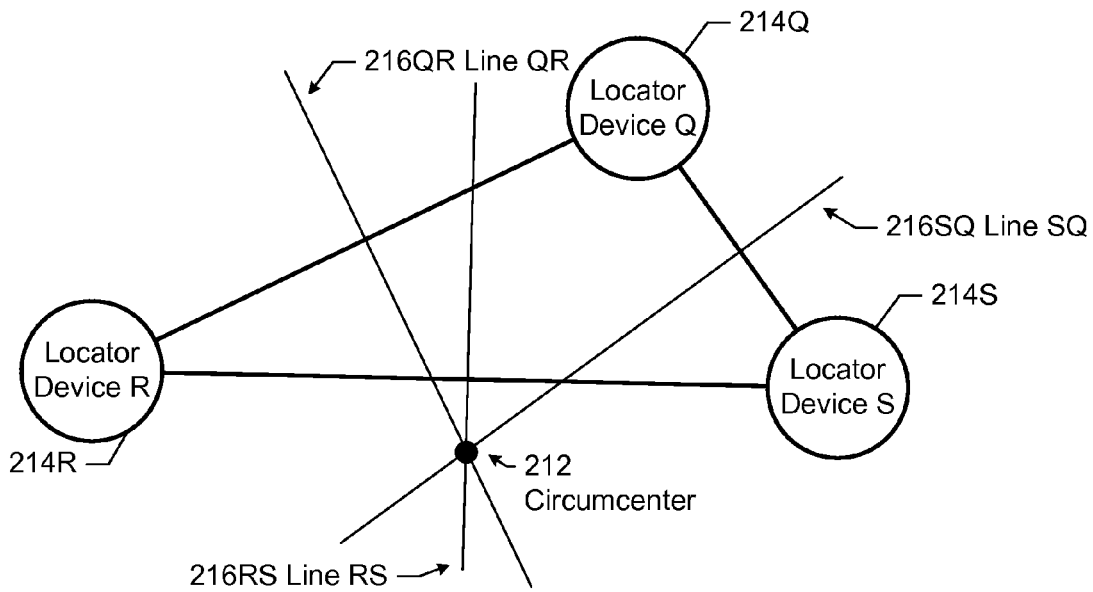
FIG. 2.2

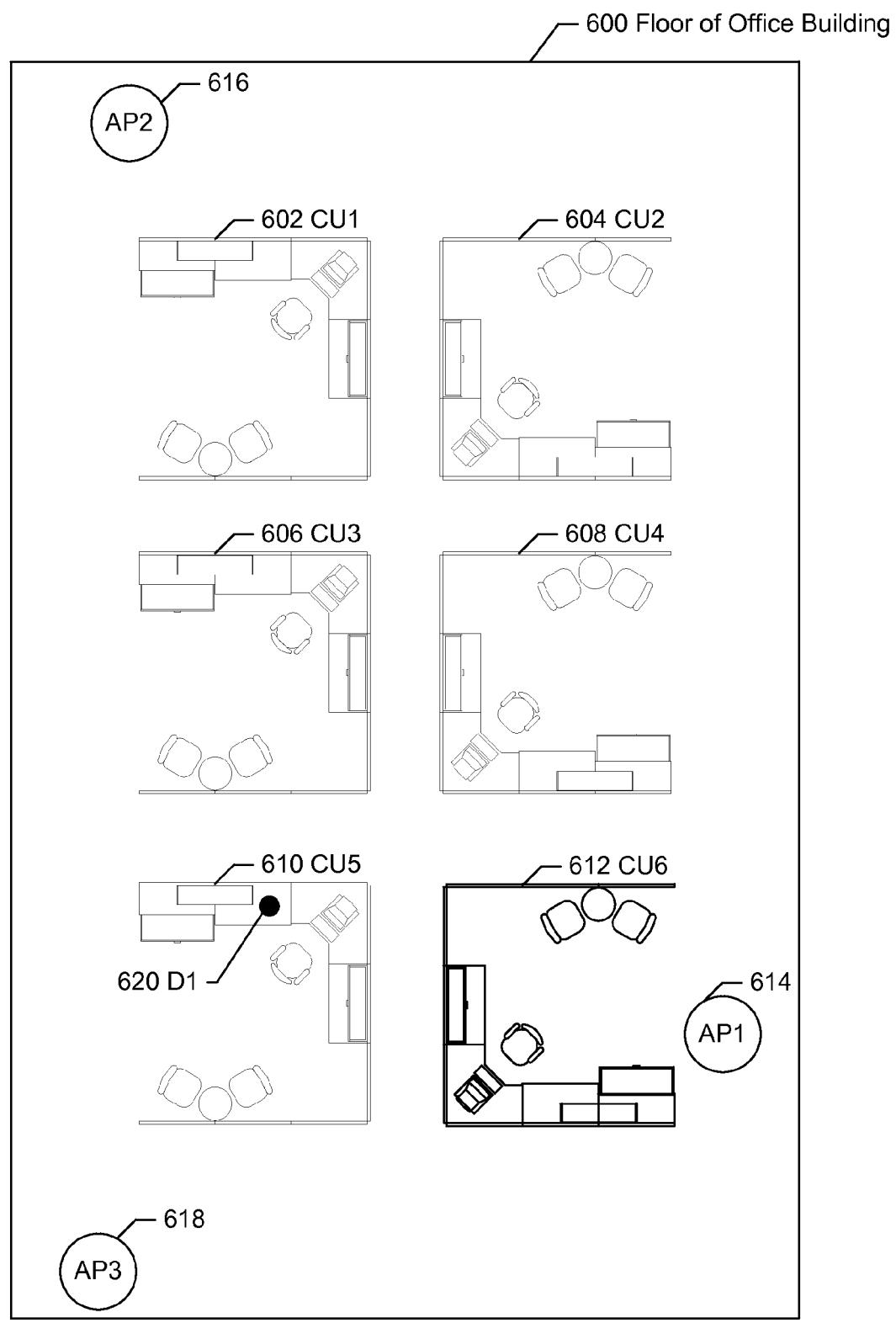
*FIG. 6.1*

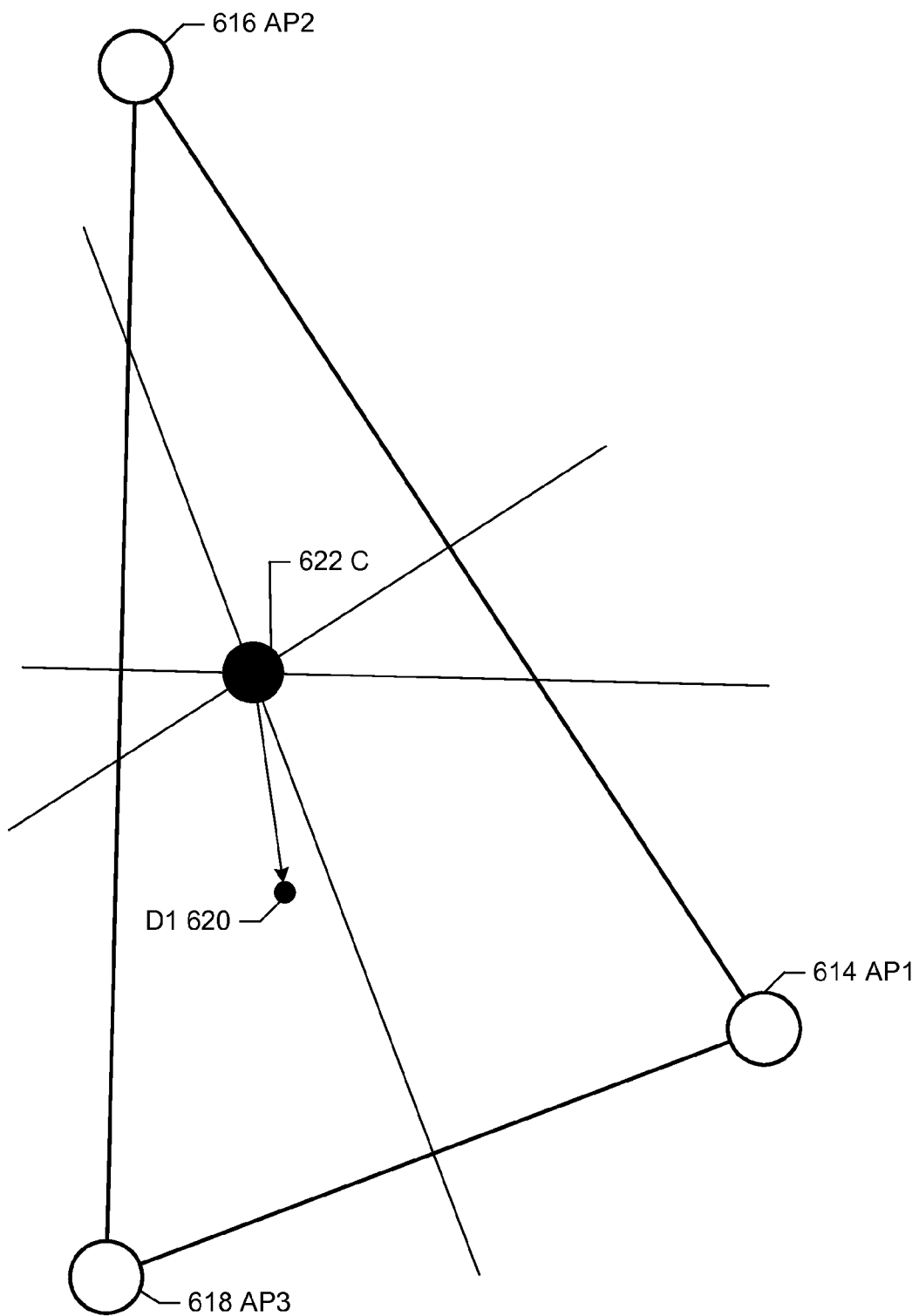
FIG. 6.2

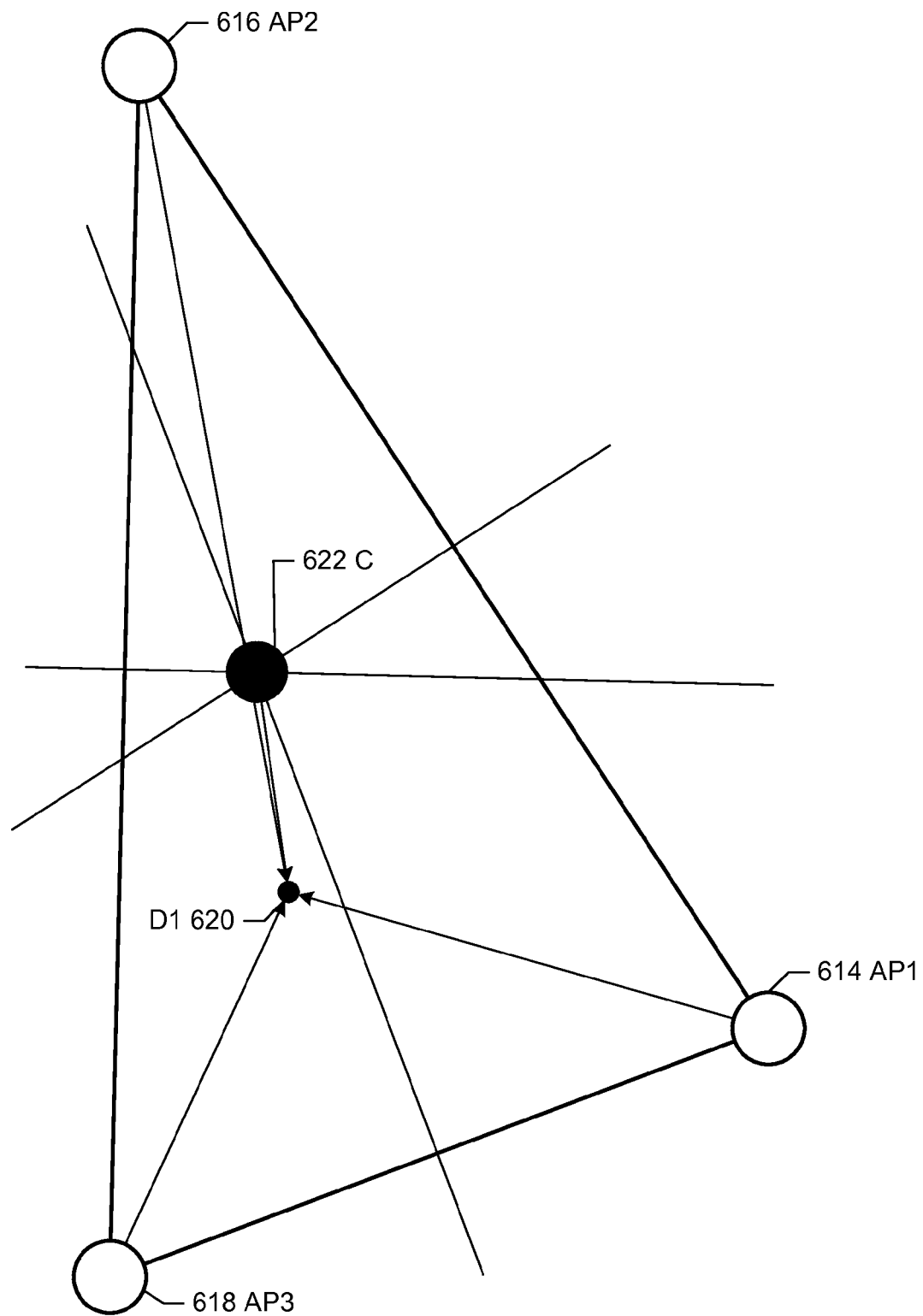
FIG. 6.3

US 9,439,037 B2

LOCATION DETERMINATION IN WIRELESS NETWORKS

BACKGROUND

Computer networks allow users to connect to other users and to various sources of content. For example, using a user's computing device, the user may receive information from a remote location. The information is sent by way of packets. In order to send and receive packets wirelessly, a computing device establishes a connection with an access point (AP) and directly transmits the packet to the AP or receives the packet from the AP. In other words, for transmission, the wireless transmission of the packet from the computing device is directly to the access point without another wireless intermediate destination. In some cases, it is useful to know the location of a device.

OVERVIEW

In general, one or more embodiments relate to a system. The system comprises: at least one locator device including a hardware processor; the system being configured to perform operations comprising: determining a first received signal strength, at a first locator device located at a first location, for a wireless signal transmitted by a target device; determining a second received signal strength, at a second locator device located at a second location, for the wireless signal transmitted by the target device; determining a third received signal strength, at a third locator device located at a third location, for the wireless signal transmitted by the target device; determining an average received signal strength of the first received signal strength, the second received signal strength, and the third received signal strength; and determining a first distance from the first locator device to the target device based at least on (a) the average received signal strength, (b) the first received signal strength, and (c) the distance from the first locator device to a circumcenter of the first location, the second location, and the third location.

In general, one or more embodiments relate to a non-transitory computer readable medium comprising instructions. The instructions, when executed by one or more hardware processors, causes performance of operations comprising: determining a first received signal strength, at a first locator device located at a first location, for a wireless signal transmitted by a target device; determining a second received signal strength, at a second locator device located at a second location, for the wireless signal transmitted by the target device; determining a third received signal strength, at a third locator device located at a third location, for the wireless signal transmitted by the target device; determining an average received signal strength of the first received signal strength, the second received signal strength, and the third received signal strength; and determining a first environmental path loss factor for wireless signals transmitted from the target device to the first locator device based at least on: (a) a transmit power of the wireless signal, the (b) the average received signal strength, (c) the distance from the first locator device to a circumcenter of the first location, the second location, and the third location.

Other aspects will be apparent from the following description and the appended claims.

BRIEF DESCRIPTION OF DRAWINGS

FIGS. 1, 2.1, and 2.2 show schematic diagrams in accordance with one or more embodiments.

FIGS. 6.1, 6.2, and 6.3 show examples in accordance with one or more embodiments.

DETAILED DESCRIPTION

Figure 1:
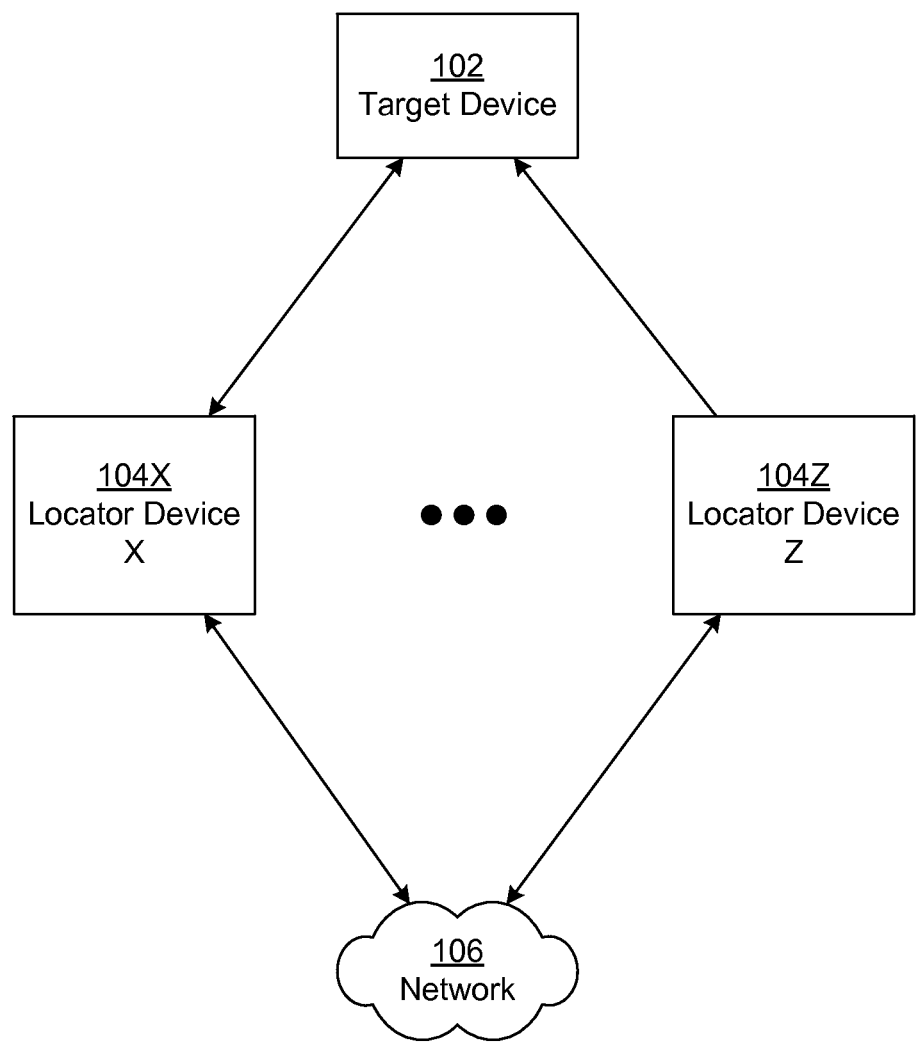

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to identifying a distance to a target device. Specifically, one or more embodiments based on received signal strengths received by at least three locator devices. For three locator devices, the average of the received signal strengths is assigned to the circumcenter of the three locator devices. Based on the average received signal strength, the location of the circumcenter, and the received strength from at least one of the locator devices, the distance to the at least one locator device is determined. In one or more embodiments, by determining the distances to multiple locator devices and applying tri-lateration, the location of the target device may be identified.

Turning to FIG. 1, FIG. 1 shows a schematic diagram of a system in accordance with one or more embodiments. As shown in FIG. 1, the system may include a target devices (102) and locator devices (e.g., locator device H (104X), locator device J (104Z)). The target devices and locator devices are discussed below.

A target device (102) is a device that is the target of the distance determination and/or location. In particular, the system is determining the distance or location of the target device. In one or more embodiments, a target device may be a station. For example, the target device (102) may be a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments. The target device (102) may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor.

In one or more embodiments, a target device (102) may be a destination and/or source of one or more packets. In particular, a target device may execute an application that processes the packets. For example, the packets may be packets of streaming communication (e.g., a video stream, audio stream, or other multimedia stream). By way of another example, packets may be control and management packets, such as DHCP broadcast packets, Router/Neighbor advertisements.

A target device (102) is connected to a network (106) via a locator device (e.g., locator device H (104X), locator device J (104Z)). A locator device (e.g., locator device H (104X), locator device J (104Z)) is a hardware device that is configured to receive and transmit packets to the target device and the network (106). The locator device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

By way of an example, a target device may be directly wired or wirelessly communicatively connected to a single access point, which is directly communicatively connected to a single controller, which is connected to the network (e.g., network (106)). In the example, the locator device may be the access point, the controller, an access point that includes the functionality of a controller, a switch (e.g., mobility access switch), or other such device. Additionally, by way of an example, one locator device may be a controller while another locator device may be an access point. The locator device that is the access point in the example may or may not be connected to the network via the locator device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using WiFi®, Bluetooth®, or related standards and that communicates with a wired network.

A locator device may be connected to any number of target devices. Further, the number of target devices connected to the locator device may vary between locator devices and over time. The connection between the target device and the locator device may include one or more wireless transmission paths. For example, the connection may include direct path from the target device to the locator device or via an indirect path, such as off of one or more walls or other objects in the physical environment in which the target device and the locator device are located.

In one or more embodiments, the path taken may have a certain amount of environmental path loss. The environmental path loss is the amount signal strength lost due to the physical environment in which the target device and locator device are located. For example, the environmental path loss may be based on interference, walls, physical objects or other aspects of the environment that causes a reduction in the signal strength that was sent from the target device and received by the locator device. In one or more embodiments, the environmental path loss may be accounted for in an environmental path loss factor. Specifically, an environmental path loss factor is a numerical value that is added to equations to adjust for the environmental path loss.

Further, although not shown in FIG. 1, the system may include an analysis device (not shown) that is one of the locator devices or directly or indirectly connected to one or more locator devices. The analysis device may include functionality to perform one or more of the embodiments discussed herein. Specifically, the analysis device includes functionality to determine the distance between the target device and one or more locator devices. Further, the analysis device may include functionality to determine the location of the target device. The analysis device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

Although not shown in FIG. 1, the target devices (102), locator devices (e.g., locator device H (104X), locator device J (104Z)), and/or analysis device may include hardware and functionality to execute software instructions. Specifically, the software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s) on the target devices (102) and/or locator devices (e.g., locator device H (104X), locator device J (104Z)), is configured to perform embodiments.

FIGS. 2.1 and 2.2 show example diagrams of locator devices and identifying the circumcenter in accordance with one or more embodiments. A circumcenter is a point that is equidistant to each of the locator devices. FIG. 2.1 shows an example in which the circumcenter (202) is in the middle of a triangle formed by the locator devices (e.g., locator device Q (204Q), locator device R (204R), locator device S (204S)). As shown by line QR (206QR), line RS (206RS), and line SQ (206SQ), the circumcenter may be identified by creating a perpendicular line that is perpendicular to and bisects the line connecting two locator devices. In other work, line QR (206) is through the midpoint of the line connecting locator device Q (204Q) and locator device R (204R). The position in which all perpendicular lines (e.g., line QR (206QR), line RS (206RS), line SQ (206SQ)) intersect is the circumcenter (202).

FIG. 2.2 shows an example in which the circumcenter (212) outside of a triangle formed by the locator devices (e.g., locator device Q (214Q), locator device R (214R), locator device S (214S)). Similar to when the circumcenter is inside the triangle, as shown by line QR (216QR), line RS (216RS), and line SQ (216SQ), the circumcenter may be identified by creating a perpendicular line that is perpendicular to and bisects the line connecting two locator devices. The position in which all perpendicular lines (e.g., line QR (216QR), line RS (216RS), line SQ (216SQ)) intersect is the circumcenter (212).

Figure 3:
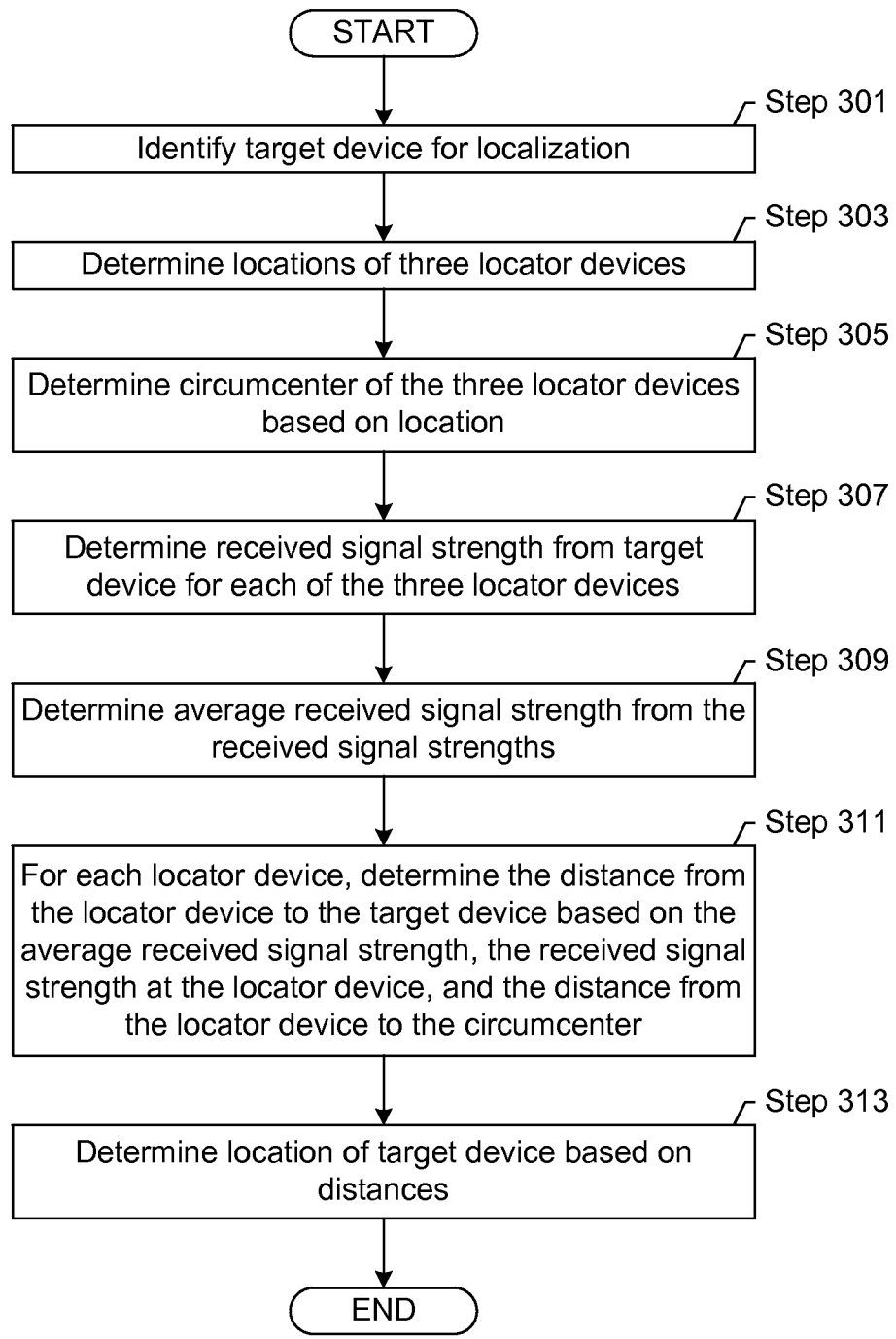
FIGS. 3, 4, and 5 show flowcharts in accordance with one or more embodiments.
Figure 4:
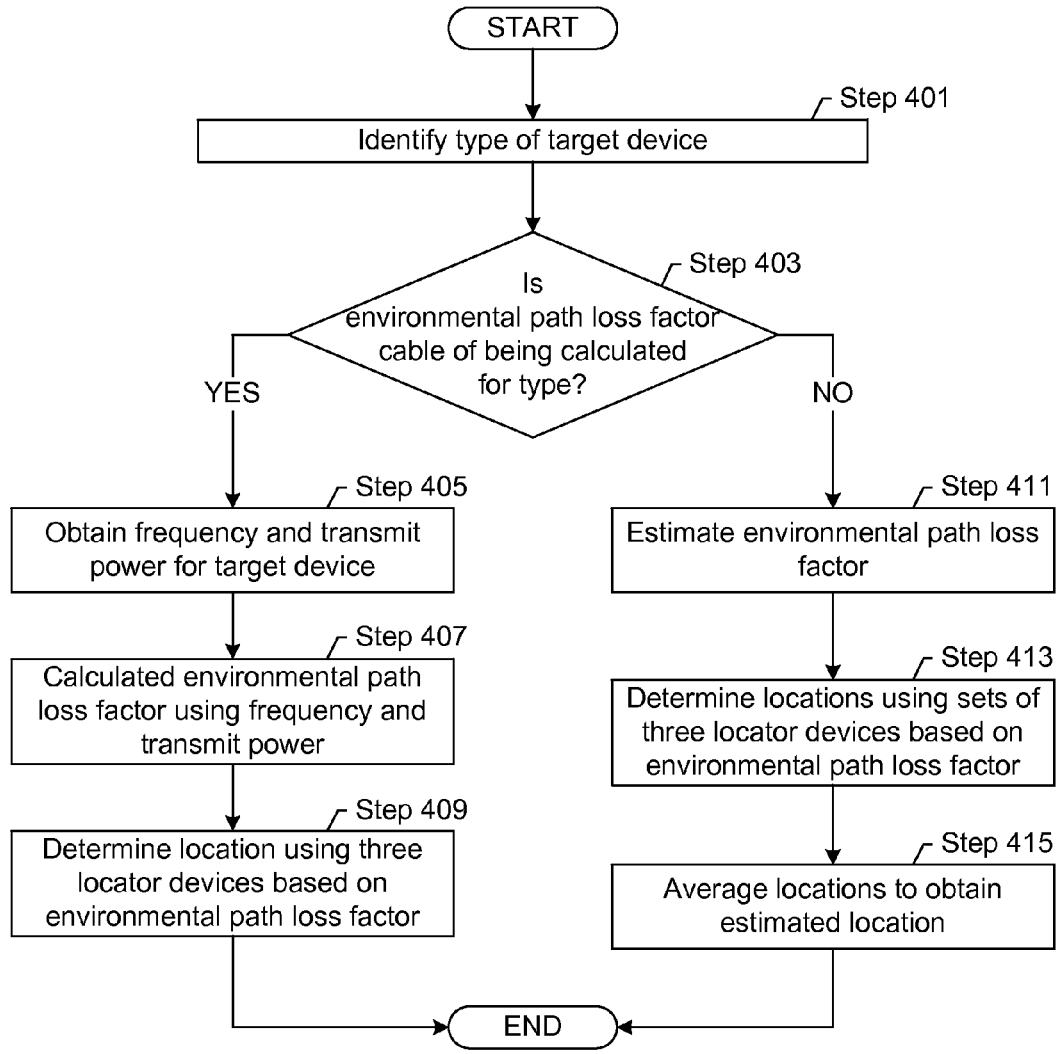
Figure 5:
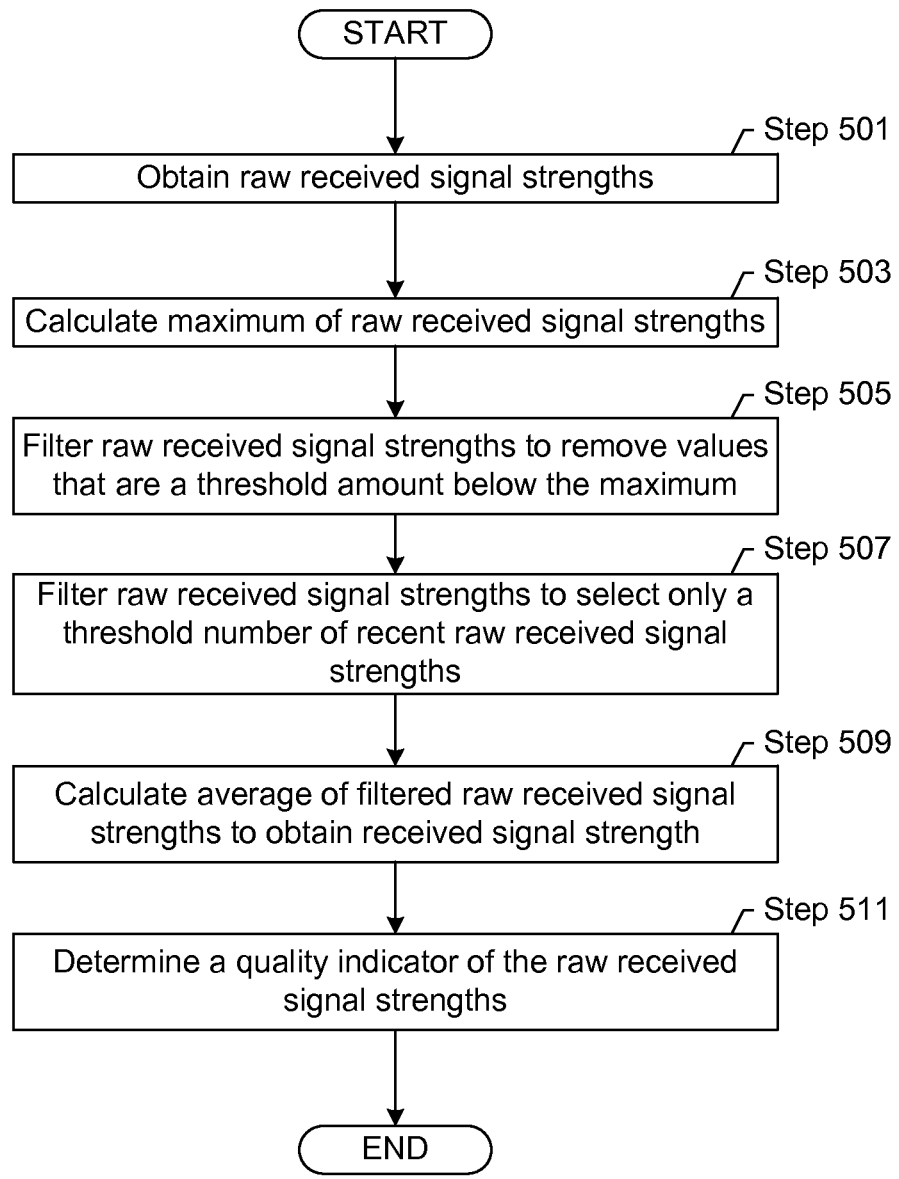

FIGS. 3, 4, and 5 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

In Step 301, a target device is identified for localization in accordance with one or more embodiments. In one or more embodiments, the client device may be identified based on a property of the client device, a network rule, a request by a network administrator, or another trigger.

In Step 303, locations of three locator devices are determined in accordance with one or more embodiments. Determining the locator device may include polling the target devices connected to each locator device to identify the locator device that is associated with the target device, polling each locator device to identify target devices associated with the locator device, obtaining the target device information from a data store, or performing another step(s). In one or more embodiments, when a target device associates with a locator device, a target device identifier is obtained from the target device and stored. Further, the target device identifier may be stored with the identifier of the associated locator device. Additional locator devices may be selected, for example, based on matching one or more criterion. For example, a criterion may be that the additional locator device is in the same subset, in communication distance, within a threshold distance, closest to the associated locator device, in the same area as the locator device (e.g., same room, same floor, etc.), or other criterion. Once the locator devices are selected, the locations of the locator devices may be obtained. In one or more embodiments, the locations of the locator devices may be obtained from a data store or reported by the locator devices. For example, the locations may be set as an attribute of the locator device.

In Step 305, a circumcenter of the three locator devices is determined based on location. Determining the circumcenter may be performed by treating the locations of the three locator devices as forming a triangle. Techniques known in mathematics may be applied to determine the circumcenter of the resulting triangle. The identified circumcenter may be an absolute location or a relative location, such as relative to one or more of the locator devices, a building having the locator devices, or relative to another point or set of points.

In Step 307, the received signal strength from the target device is determined for each of the three locator devices in accordance with one or more embodiments. In one or more embodiments, each of the three locator devices receives at least one packet from the target device. The packet received may be any type of wirelessly transmitted packet. Further, the packet may be received via different wireless transmission paths. For example, the packet may be received via a direct path from the target device to the locator device or via an indirect path, such as off of one or more walls or other objects in the environment.

In Step 309, an average received signal strength is determined from the received signal strengths in accordance with one or more embodiments. In one or more embodiments, the average is an absolute average. In other words, the three signal strengths may be added together and divided by three to obtain the average.

In Step 311, for each locator device, the distance is determined from the locator device to the target device based on the average received signal strength, the received signal strength at the locator device, and the distance from the locator device to the circumcenter. To determine the distance, the average received signal strength is attributed or assigned to the circumcenter. In other words, the average received signal strength represents the signal strength from the target device by each of the locator devices if the target device were located at the circumcenter.

In one or more embodiments, determining a distance includes determining a ratio of the distance from the locator device to the circumcenter to the distance from the locator device to the target device and using the ratio to determine the first distance. The ratio may be a function of the ratio of the average received signal strength and the received signal strength by the locator device. To obtain the ratio of the received signal strengths, a difference value between the average received signal strength and the received signal strength by the locator device is determined.

By way of an example, the distance may be determined using the following equation 1 (Eq. 1):

$$d_i = d_C * 10^{-\left(\frac{\Delta S_{i,C}}{n*10}\right)} \quad \text{(Eq. 1)}$$

In Eq. 1, $d_i$ is the distance from the $i^{th}$ locator device to the target device, $d_C$ is the distance to the circumcenter from the $i^{th}$ locator device, n is the value of an environmental path loss factor, and $\Delta S_{i,C}$ is the change in received signal strength between the $i^{th}$ locator device and the average received signal strength. In other words, $\Delta S_{i,C}$ may be calculated using the following equation 2 (Eq. 2):

$$\Delta S_{i,C} = |S_i - S_C| \quad \text{(Eq. 2)}$$

In Eq. 2, $S_i$ is the received signal strength at the $i^{th}$ locator device and $S_C$ is the average received signal strength. In one or more embodiments, the received signal strength and the average received signal strength in Eq. 2 are in decibel unit of measurement. Eq. 1 and Eq. 2 are only example equations that may be used in accordance with one or more embodiments. Unless expressly claimed otherwise, equivalent and/or different equations may be used without departing from the scope of the claims.

In Step 313, the location of the target device is determined based on distances in accordance with one or more embodiments. After determining the distances between three locator devices and the target device, trilateration may be used to determine the location of the target device. Specifically, for each locator device, the location the locator devices along with the distance between the locator device and the target device is used to determine possible points in which the target device may be located. The intersection of the possible points by the three locator devices is the determined location of the target device in accordance with one or more embodiments.

FIG. 4 shows a flowchart for obtaining an environmental path loss factor in accordance with one or more embodiments. In Step 401, the type of target device is determined in accordance with one or more embodiments. In one or more embodiments, the type of target device may be the manufacturer of the target device, the model of the target device, the operating system of the target device, hardware information about one or more components of the target device, or other information about the target device or a combination thereof.

In Step 403, a determination is made whether the environmental path loss factor is capable of being calculated for the type of target device in accordance with one or more embodiments. The environmental path loss factor is capable of being calculated when transmission information for the type of target device is known or determinable in accordance with one or more embodiments. The transmission information includes the frequency and transmits power of the packet(s) received by the locator device. In some embodiments, such transmission information may be stored in a data repository (e.g., server, database, file system, network location, or other data store). Thus, determining whether the transmission is known or determinable may be performed by querying the data repository for the transmission information using the information about the type of target device. If the data repository responds with the transmission information, then the environmental path loss factor is capable of being calculated in accordance with one or more embodiments.

In Step 405, if the environmental path loss factor is capable of being calculated, the frequency and transmit power for the target device is obtained in accordance with one or more embodiments. As discussed above, the frequency and transmit power for the type of packet received by the locator device may be obtained from the data repository.

In Step 407, the environmental path loss factor is calculated using the frequency and transmit power in accordance with one or more embodiments. The environmental path loss factor may be calculated as a function of transmit power, the average received signal strength, frequency, and the distance to the circumcenter in accordance with one or more embodiments. By way of an example, the environmental path loss factor may be calculated using the following equation 3 (Eq. 3):

$$n = \frac{\log\left(\frac{P_t}{S_C}\right)}{\log\left(\frac{4*\pi*d_C}{\lambda}\right)} \quad \text{(Eq. 3)}$$

In Eq. 3, n is the environmental path loss factor, $P_t$ is a transmit power of the target device, $S_C$ is the average received signal strength, $d_C$ is a distance from the first locator device to the circumcenter, and $\lambda$ is a frequency. Eq. 3 is only an example equation that may be used in accordance with one or more embodiments. Unless expressly claimed otherwise, equivalent and/or different equation(s) may be used without departing from the scope of the claims.

In Step 409, the location is determined using three locator devices based on the environmental path loss factor in accordance with one or more embodiments. For example, the location may be determined using Eq. 1.

Returning to Step 403, if a determination is made that the environmental path loss factor may not be calculated, then the environmental path loss is estimated in Step 411 in accordance with one or more embodiments. In one or more embodiments, estimating the environmental path loss value may be performed by selecting a random number, such as a number between two and four, estimating based on known information such as the type of environment, or using another estimation technique. Another method for estimating the environmental path loss factor may be performed by using an environmental path loss factor for a different device or a different device type in the same environment. For example, consider the scenario in which a device of known type is in the same environment as the target device is or will be, such that lookup of the power transmit information is successful. In such a scenario, the environmental path loss factor may be determined using the power transmit information as previously described. Concurrently or subsequently, the location of a target device is to be determined. In such a scenario, the environmental loss factor that was determined based on the known device type is used for the determination of location for the target device, without individually determining the environmental path loss factor for the target device.

In Step 413, estimated locations of the target device is determined using sets of three locator devices based on an environmental path loss factor in accordance with one or more embodiments. For example, the steps discussed above with reference to FIG. 3 may be performed multiple times using different permutations of various locator devices. Each permutation has a different triangle that is formed, different circumcenter, and different average. In one or more embodiments, the same value of the environmental path loss factor is used for each permutation. Each permutation has a resulting estimated location, which may be the same or different than other permutations.

In Step 415, the locations are averaged to estimate the location of the target device in accordance with one or more embodiments. The average may be an absolute average or a weighted average. For example, weights may be applied based on a quality indicator (discussed below), the location of the locator devices (e.g., closer locator devices have greater weights), or another basis, or combination thereof. In one or more embodiments, the analysis device may attribute the average location as the location of the target device.

FIG. 5 shows a flowchart for obtaining a received signal strength in accordance with one or more embodiments. In one or more embodiments, prior to using a received signal strength in FIG. 3, preprocessing may be performed. The preprocessing may include, for example, applying filters to the signal and/or determining the quality of the signal. FIG. 5 shows an example for preprocessing in accordance with one or more embodiments.

In Step 501, raw received signal strengths are received in accordance with one or more embodiments. In particular, a locator device may receive and analyze multiple packets. The multiple packets may be the same packet received on different transmission paths or the different packets received on the same or different transmission paths. For each of the multiple packets, the signal strength is determined. Further, timing information to track the order in which packets are received may be maintained.

In Step 503, the maximum of the raw received signal strengths is calculated in accordance with one or more embodiments. In one or more embodiments, the maximum is a moving maximum, such as the maximum of the immediately preceding x number of raw received signals.

In Step 505, the raw received signal strengths are filtered to remove values that are a threshold amount below the maximum value in accordance with one or more embodiments. In other words, the maximum is reduced by a threshold amount to obtain a minimum threshold strength. Any raw received signal strength less than the minimum threshold strength is discarded or ignored in accordance with one or more embodiments. The remaining raw received signal strengths may be kept and used for further analysis.

In Step 507, the raw received signal strengths are filtered to select only a threshold number of recent raw received signal strengths in accordance with one or more embodiments. In one or more embodiments, the threshold number may be the immediately preceding y number of raw received signal strengths. In other words, only y number of raw received signal strengths remains. The y number may be based on the raw received signal strengths before or after the filtering in Step 505.

Although Steps 505 and 507 present two filters, other and/or different filters may be applied without departing from the scope. For example, a filter may be applied that selects raw received signal strengths that are for packets received through the direct transmission path only. As another example, a filter may be applied that filters based on time to remove any raw received signal strengths that are transmitted and/or received more than a threshold amount of time from the current time.

In Step 509, the average of the filtered raw received signal strengths to obtain received signal strengths in accordance with one or more embodiments. In one or more embodiments, the average may be an absolute average or a weighted average. For example, a weighted average may be to give greater weights to the more recent raw received signal strengths than the older raw received signal strengths.

In Step 511, a quality indicator of the raw received signal strengths is determined in accordance with one or more embodiments. The quality indicator is a measure of the accuracy of the raw received signal strengths. In some embodiments, the quality indicator is representative of the variability in the signal strengths. For example, the quality indicator may be the standard deviation or variance of the raw received signal strengths before and/or after the applying at least one of the filters. As another example, the quality indicator may be representative of the uncertainty in the average. In the example, the quality indicator may be calculated as the standard deviation or variance divided by the number of raw received signal strengths used to calculate the average (e.g., y). By way of another example, the quality indicator may be range of the 95% confidence interval. The above are only examples of quality indicators that may be provided to the analysis device or used by the analysis device. Additional or alternative quality indicators may be calculated and used without departing from the scope of the claims.

FIGS. 6.1, 6.2, and 6.3 show an example in accordance with one or more embodiments. The following example is for explanatory purposes only and not intended to limit the scope. For the purposes of the example, consider the scenario in which the locator devices are access points (APs). Turning to FIG. 6.1, for the following example, consider the scenario in which a floor of an office building (600) has a six cubicles (e.g., CU1 (602), CU2 (604), CU3 (606), CU4 (608), CU5 (610), CU6 (612)) and three access points (e.g., AP1 (614), AP2 (616), AP3 (618)). In the example, a network administrator has identified unauthorized client device 1 (D1) (620). Although the network administrator may easily remove D1 (620) from the network, the network administrator would also like to inform the employee that such a client device is not allowed on the network. Thus, the network administrator wants to know the physical location of D1 (614). AP1 (614), AP2 (616), and AP3 (618) each receive packets from the D1 (620) and determine the received signal strengths from the packets received.

FIG. 6.2 shows a triangle formed by AP1 (614), AP2 (616), and AP3 (618). For reference purposes, FIG. 6.2 also shows the location of device D1 (620) even though the location is not yet determined. Using the triangle and based on the locations, the circumcenter C (622) of the triangle formed by AP1 (614), AP2 (616), and AP3 (618) is determined. The average of the received signals strengths by AP1 (614), AP2 (616), and AP3 (618) is determined and attributed to the circumcenter C (622). In other words, if D1 were located at C (622) rather than D1's current location, the signal strength received by locator devices from D1 is assumed to be the average received signal strength in accordance with one or more embodiments.

Continuing with the example, FIG. 6.3 shows determining the distances to the target device from the access points and using the distances to calculate the location. For each access point (e.g., AP1 (614), AP2 (616), and AP3 (618)), the distance between the access point and D1 (620) is determined based on the average received signal strength, the received signal strength by the access point, and the distance to the circumcenter. Trilateration is used to determine the location of D1 (620) as being in CU5 (610 in FIG. 6.1). The location of D1 (620) to the network administrator, who contacts the employee in CU5 (610) and informs the employee about the policy against associating target device D1 (614) with any device on the network.

Figure 7:
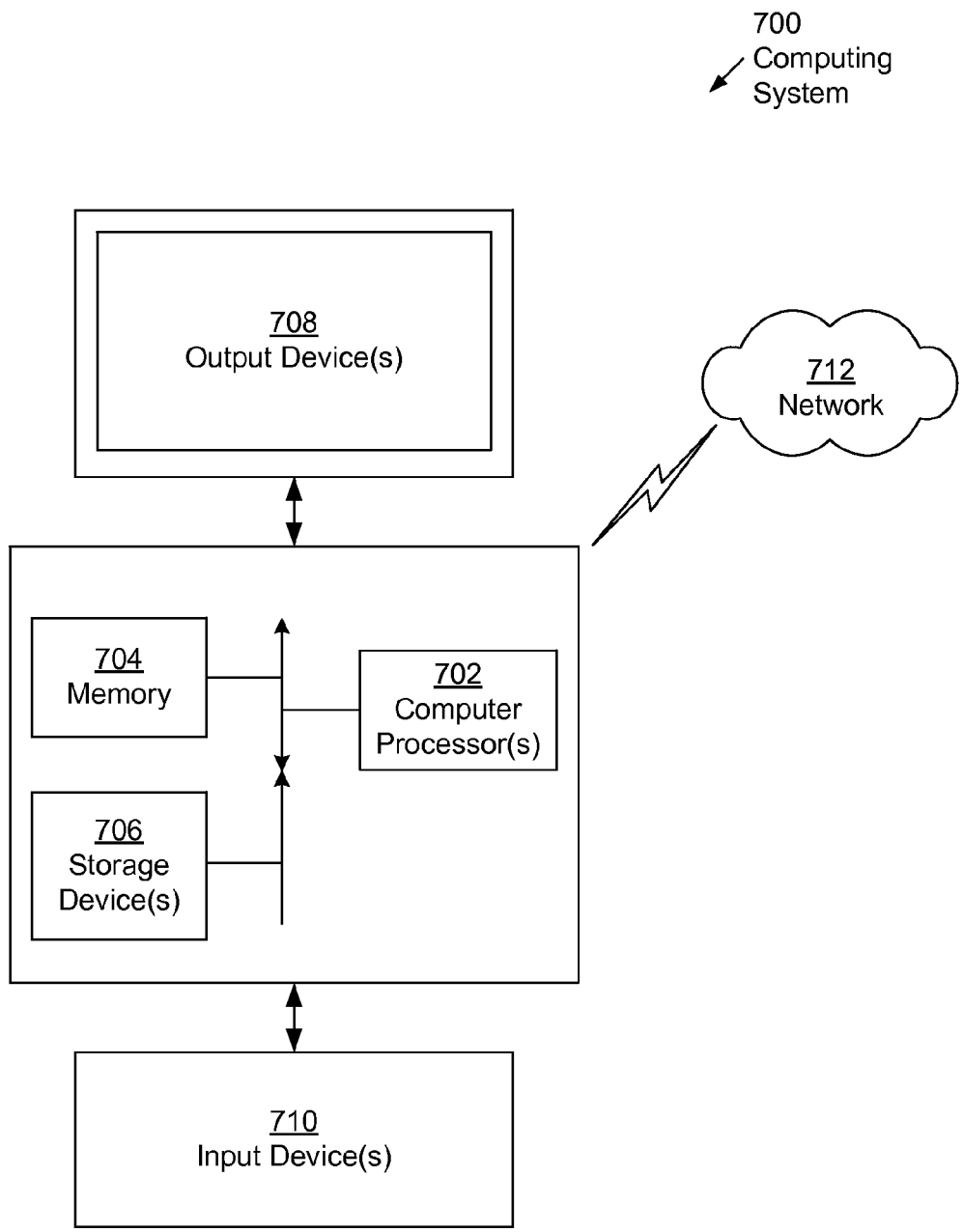
FIG. 7 shows a computing system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s)

(706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (700) may be located at a remote location and connected to the other elements over a network (714). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A system comprising:
an analysis device including a hardware processor;
the system being configured to:
  determine, with the analysis device, a first received signal strength, for a first locator device located at a first location for a wireless signal transmitted by a target device, wherein the determination of the first received signal strength comprises:
    determining a plurality of raw received signal strengths at the first locator device;
    determining a maximum of the plurality of raw received signal strengths;
    applying a first filter to remove any raw received signal strengths that are a threshold amount below the maximum to obtain a plurality of remaining received signal strengths; and
    calculating a moving average of the remaining received signal strengths as the first received signal strength;
  determine, with the analysis device, an average received signal strength of the first received signal strength, a second received signal strength for a second locator device located at a second location for the wireless signal transmitted by the target device, and a third received signal strength for a third locator device located at a third location for the wireless signal transmitted by the target device; and
  determine a first distance from the first locator device to the target device based at least on (a) the average received signal strength, (b) the first received signal strength, and (c) the distance from the first locator device to a circumcenter of the first location, the second location, and the third location.

2. The system of claim 1, wherein the determination of the first distance is further based on an environmental path loss factor.

3. The system of claim 2, wherein the environmental path loss factor is computed based on a signal strength of wireless signals received by the first locator device.

4. The system of claim 1, wherein the determination of the first distance is to determine a difference value between the first received signal strength and the average received signal strength, and using the difference value to compute the first distance.

5. The system of claim 1, wherein the determination of the first distance is a ratio of (a) the distance from the first locator device to the circumcenter to (b) the distance from the first locator device to the target device, and using the ratio to determine the first distance.

6. The system of claim 1, wherein the determination of the first distance comprises multiplying the distance from the first locator device to the circumcenter by ten raised to an exponent, wherein the exponent comprises a function of the first received signal strength and the average received signal strength.

7. The system of claim 1, wherein the system is further to:
determine a second distance from the second locator device to the target device;
determine a third distance from the third locator device to the target device; and
determine a location of the target device based on the first distance, the first location, the second distance, the second location, the third distance, and the third location.

8. The system of claim 1, wherein the system is further to:
determine a quality indicator for the first received signal strength.

9. The system of claim 1, wherein the system is further to determine an environmental path loss factor based on a transmit power of the target device, an average signal, and the distance to the circumcenter, and wherein the determination of the first distance is based on the environmental path loss factor.

10. The system of claim 1, wherein the determination of the first distance comprises a computing a difference between the circumcenter and the location of target device based on an environmental path loss factor.

11. A non-transitory computer readable medium comprising instructions which, when executed by one or more hardware processors, causes performance of operations:
determine a first received signal strength for a first locator device located at a first location for a wireless signal transmitted by a target device, wherein the determination of the first received signal strength comprises operations: I
  determining a plurality of raw received signal strengths at the first locator device;
  determining a maximum of the plurality of raw received signal strengths;
  applying a first filter to remove any raw received signal strengths that are a threshold amount below the maximum to obtain a plurality of remaining received signal strengths; and
  calculating a moving average of the remaining received signal strengths as the first received signal strength;
determine an average received signal strength of the first received signal strength, a second received signal strength for a second locator device located at a second location for the wireless signal transmitted by the target device, and a third received signal strength for a third locator device located at a second location for the wireless signal transmitted by the target device; and determine a first environmental path loss factor for wireless signals transmitted from the target device to the first locator device based at least on: (a) a transmit power of the wireless signal, the (b) the average received signal strength, (c) the distance from the first locator device to a circumcenter of the first location, the second location, and the third location.

12. The non-transitory computer readable medium of claim 11, wherein the operations further comprise determine a first distance to the target device using the environmental path loss factor.

13. The non-transitory computer readable medium of claim 12, wherein the determination of the first distance, the operations further comprise determine a difference value between the first received signal strength and the average received signal strength, and using the difference value to compute the first distance.

14. The non-transitory computer readable medium of claim 12, wherein the determination of the first distance comprises determining a ratio of (a) the distance from the first locator device to the circumcenter to (b) the distance from the first locator device to the target device, and using the ratio to determine the first distance.

15. The non-transitory computer readable medium of claim 12, wherein the operations further comprise:
determine a second distance from the second locator device to the target device;
determine a third distance from the third locator device to the target device; and
determine a location of the target device based on the first distance, the first location, the second distance, the second location, the third distance, and the third location.

16. The non-transitory computer readable medium of claim 12, wherein the operations further comprise determine a quality indicator for the first received signal strength.

17. The non-transitory computer readable medium of claim 11, wherein the operations further comprise determine the first distance comprises a computing a difference between the circumcenter and the location of target device based on an environmental path loss factor.

18. The non-transitory computer readable medium of claim 11, wherein the determination of the first distance comprises calculating:

$$n = \frac{\log\left(\frac{P_t}{S_C}\right)}{\log\left(\frac{4*\pi*d_C}{\lambda}\right)},$$

where n is the environmental path loss factor, $P_t$ is a transmit power of the target device, $S_C$ is the average received signal strength, $d_C$ is a distance from the first locator device to the circumcenter, and $\lambda$ is a frequency.

19. A method, executable by a hardware processor, the method comprising:
determining a plurality of received signal strengths for various locator devices located at a plurality of locations, for a wireless signal transmitted by a target device,
wherein the determination of the plurality received signal strengths include:
determining a plurality of raw received signal strengths at a first locator device;
determining a maximum of the plurality of raw received signal strengths;
applying a first filter to remove any raw received signal strengths that are a threshold amount below the maximum to obtain a plurality of remaining received signal strengths; and
calculating a moving average of the remaining received signal strengths as the plurality of received signal strengths;
determining an average received signal strength of the plurality of received signal strengths; and
determining an environmental path loss factor for wireless signals transmitted from the target device to the various locator devices based at least on: (a) a transmit power of the wireless signal; (b) the average received signal strength; and (c) the distance from one of the plurality of locator devices to a circumcenter to the multiple locations.

* * * * *